US006301488B1

(12) United States Patent
Alos et al.

(10) Patent No.: US 6,301,488 B1
(45) Date of Patent: Oct. 9, 2001

(54) VOICE AND DATA TERMINAL FOR A RADIOTELEPHONE NETWORK

(75) Inventors: Raphaël Alos, Osny; Marc Porato, Loconville; Jean-Marc Dimech, Chaumont-en-Vexin; Francis Sykes, Paris, all of (FR)

(73) Assignee: Sagem SA (FR)

( * ) Notice: Subject to any disclaimer, the term of this patent is extended or adjusted under 35 U.S.C. 154(b) by 0 days.

(21) Appl. No.: 09/117,235
(22) PCT Filed: Jan. 24, 1997
(86) PCT No.: PCT/FR97/00136
§ 371 Date: Dec. 15, 1998
§ 102(e) Date: Dec. 15, 1998
(87) PCT Pub. No.: WO97/27714
PCT Pub. Date: Jul. 31, 1997

(30) Foreign Application Priority Data

Jan. 26, 1996 (FR) .................................................. 96 00931
Oct. 9, 1996 (FR) .................................................. 96 12294

(51) Int. Cl.[7] .................................................. H04B 1/38
(52) U.S. Cl. .......................... 455/557; 455/466; 455/553; 375/216
(58) Field of Search .................................. 455/466, 414, 455/556, 557, 558, 552, 553, 551, 31.3; 375/216; 370/330, 336, 337, 347

(56) References Cited

U.S. PATENT DOCUMENTS

| 5,189,632 | * | 2/1993 | Paajanen et al. | 455/556 |
| 5,566,226 | * | 10/1996 | Mizoguchi et al. | 455/558 |
| 5,625,673 | * | 4/1997 | Grewe et al. | 455/556 |
| 5,699,405 | * | 12/1997 | Suzuki | 455/558 |
| 5,777,991 | * | 7/1998 | Adachi et al. | 455/552 |
| 5,802,483 | * | 9/1998 | Morris | 455/556 |
| 5,845,215 | * | 12/1998 | Henry et al. | 455/557 |
| 5,884,190 | * | 3/1999 | Lintula et al. | 455/557 |
| 5,896,375 | * | 4/1999 | Dent et al. | 370/347 |
| 5,903,849 | * | 5/1999 | Selin et al. | 455/557 |
| 5,940,767 | * | 8/1999 | Bourgeouis et al. | 455/466 |
| 5,953,647 | * | 9/1999 | Patel et al. | 455/557 |
| 5,966,669 | * | 10/1999 | Kenmochi et al. | 455/557 |
| 6,009,325 | * | 12/1999 | Retzer et al. | 455/466 |

FOREIGN PATENT DOCUMENTS

| 40 20 375 | 1/1992 | (DE) . |
| 0 693 860 | 1/1996 | (EP) . |
| 2 290 007 | 12/1995 | (GB) . |
| WO 95/07595 | 3/1995 | (WO) . |

OTHER PUBLICATIONS

Motorola Technical Developments, vol. 20, Oct. 1993, Schaumburg, Illinois, U.S. pp. 110–111, XP000403841.
Data Communications, vol. 24, No. 12, Sep. 1995, New York, US., pp. 37–38, XP000527748 Taylor K: Going Wireless: Cellular Phone Melded With Modem.

* cited by examiner

Primary Examiner—Lester G. Kincaid
(74) Attorney, Agent, or Firm—Akerman Senterfitt

(57) ABSTRACT

A radio-telephone terminal includes connection structure which connects to a radio-telephone network, a telephone handset and a data adaptation circuit arranged to be connected to a data transmission apparatus. The adaptation circuit is integrated into the terminal and can include a microprocessor arranged to manage vocal telephone communications and the data passing through the adaptation circuit.

18 Claims, 2 Drawing Sheets

VOICE AND DATA TERMINAL FOR A RADIOTELEPHONE NETWORK

FIELD OF THE INVENTION

Telephone networks are being used more and more to transmit data because they offer great ease of access. In order to attach a data transmission device, such as a personal computer (PC), to a telephone network, it is connected via a connection adaptor to a telephone link. This adaptor comprises a modem which ensures conversion of the signals transmitted by the PC, so that they are of the desired level and of the type of modulation for transmission via the network, and ensures the reverse conversion for received signals. Since the telephone link generally permits only a single communication, a two-channel switching device makes it possible to select an associated telephone receiver or the modem.

BACKGROUND OF THE INVENTION

In order to establish a communication, the calling PC controls, via the adaptor, the switching of the switching device to its channel and transmits telephone dialling commands, these commands coming from the keyboard of the PC or being produced by software in the PC. Then, the telephone communication being established, the exchange of data takes place via the adaptor which also may ensure a logic adaptation, ie. may carry out a protocol conversion between the input/output signals of the PC and those transmitted via the network.

The problem addressed by the Applicant and which must in no way limit the scope of this application, related to the GSM telephone network and it was a GSM telephone terminal which was in charge of switching towards an adaptor with a GSM modem for connection of a PC having a communication function.

An adaptor of this type, however, is very expensive.

The present invention aims to reduce this difficulty.

SUMMARY OF THE INVENTION

To this end, the invention relates to a radio-telephone terminal comprising connection means to connect, to a digital radio-telephone network, a telephone handset, data adaptation means arranged to be connected to a data transmission device and a central unit for management of vocal telephone communications and communications of the said data, characterised in that the central unit is arranged in order, in a time-sharing manner, to manage the said vocal telephone communications and to proceed with the said adaptation of the digital data.

The addition of relative functions to the data seems, a priori, to be economically irrational. Indeed it consists of adding functions of data transmission and adaptation to the terminal of which the basic function is telephony, without knowing whether the cost excess which this will cause will be compensated for in effective usage. In other words, the approach appearing to be rational and which had previously been followed, was to implant an adaptation card in the data transmission device. One of the merits of the Applicant is thus having thought of a radio terminal economically and, ultimately, offering a service of direct connection to the network. In fact, the adaptation function, being integrated into the central unit, requires no specific unit because it uses all or part of the central unit in a time-sharing manner. To sum up, the in-depth examination of the solution which is, a priori, irrational has shown the Applicant that this line of research in fact led to the best economic solution.

In a very advantageous manner, the central unit is arranged to manage the data, and the data transmission means are integrated into the terminal.

This terminal can thus possess all the functions required to deal with useful applications, ie. on the one hand, to establish a data transmission link with a remote computer terminal or server and, on the other hand, to then exchange therewith and to interpret data relating to the application in question. To sum up, in this case the terminal incorporates the functions of a computer terminal.

Figure 1:
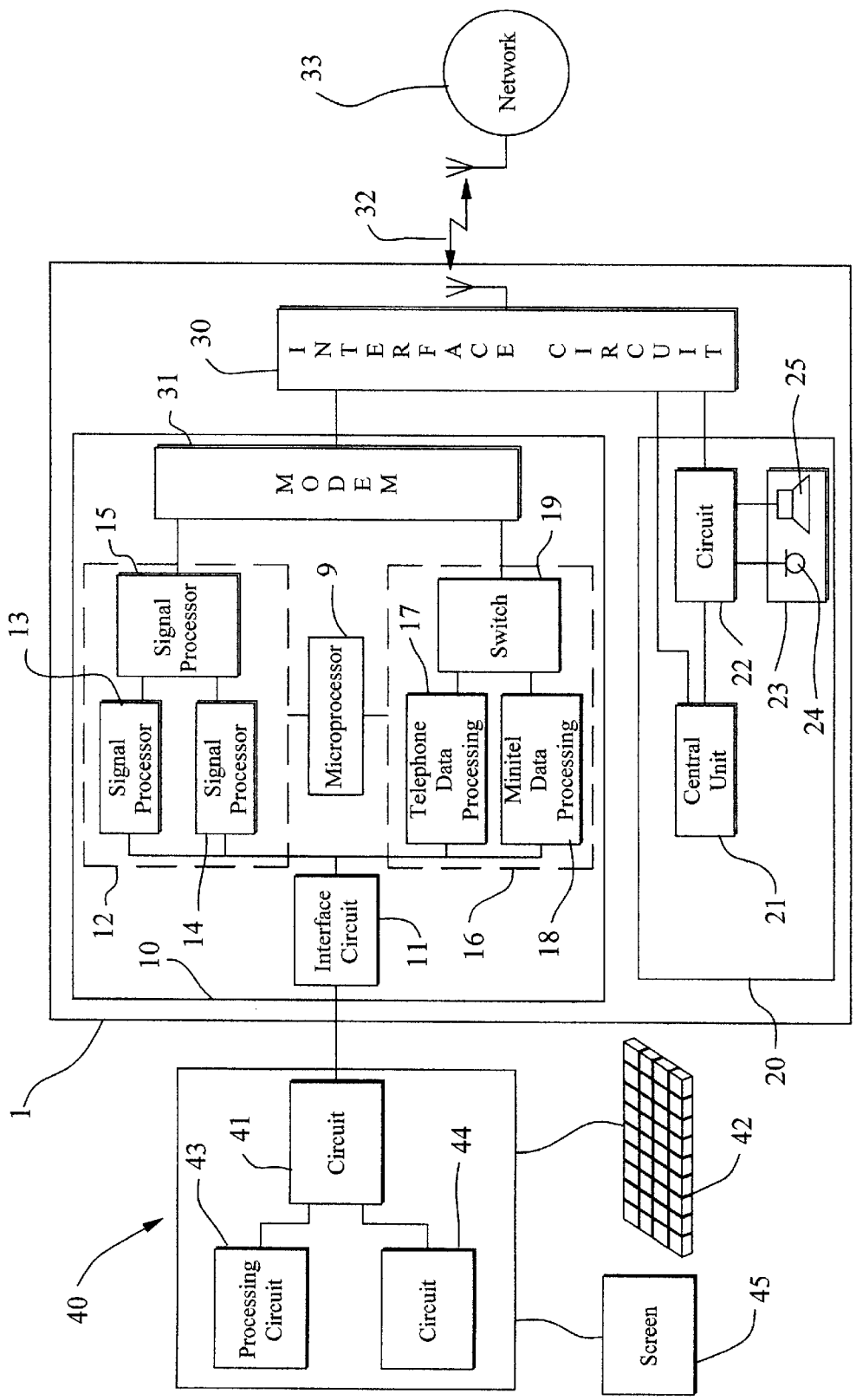
FIG. 1 shows a terminal connected to a device for transmission of data according to an embodiment of the invention.
Figure 2:
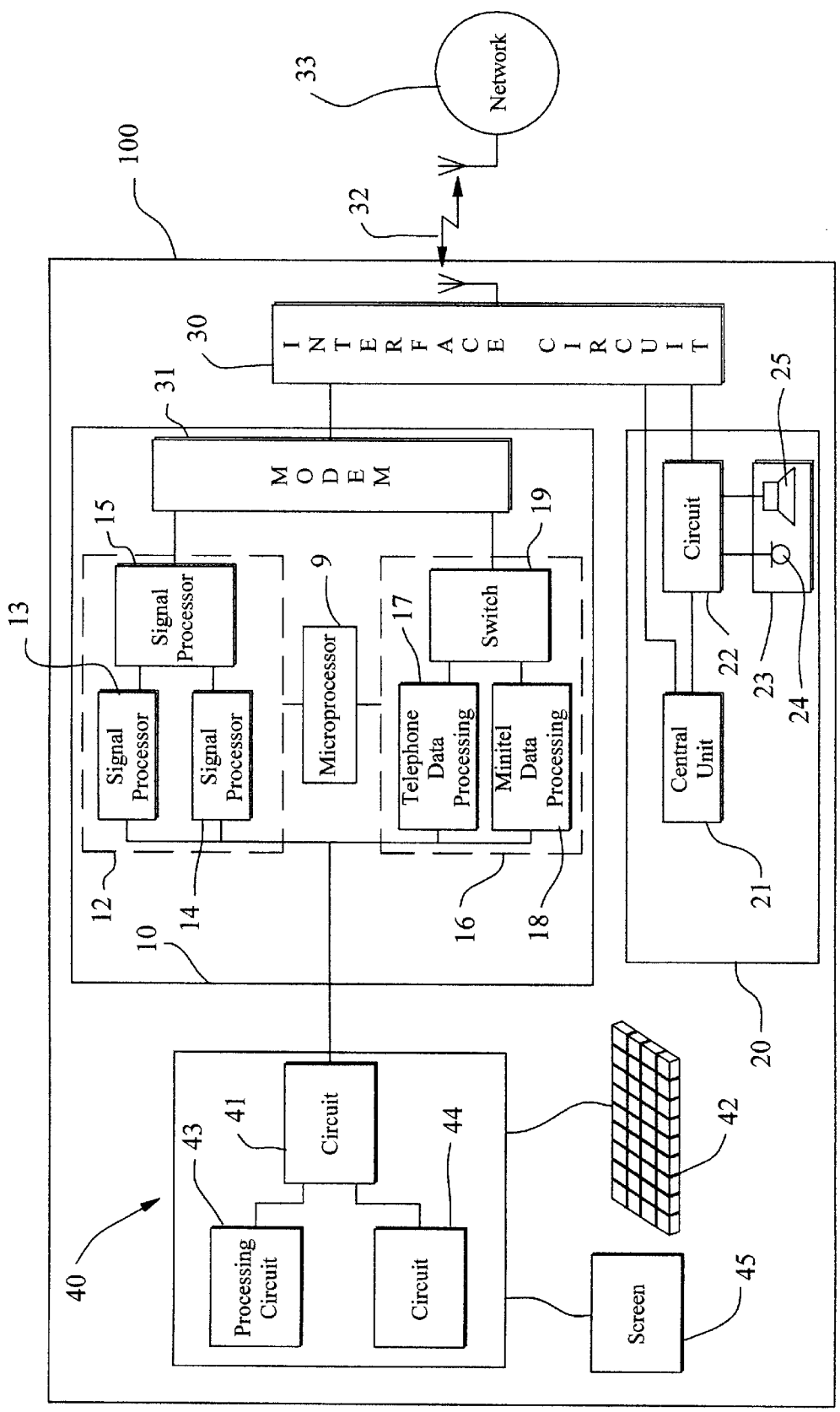
FIG. 2 shows a terminal connected to a device for transmission of data according to an alternative embodiment of the invention.

The invention will be better understood with the aid of the following description of two preferred embodiment variations of the voice-data terminal of the invention, with reference to the attached drawing in which FIGS. 1 and 2 schematically illustrate the two embodiment varations respectively.

It will be understood that the diagrams are for didactic purposes, ie. the functions described are, in some cases, carried out by a single circuit in a time-sharing manner. In other words, the blocks represent functions and not circuits reserved for these functions, as will be explained hereinunder.

FIG. 1 illustrates a terminal 1 connected to a device 40 for transmission of data, in this case a personal computer (PC). The terminal 1 is a telephone set, in this case for a radio-telephone network, linked by a radio link 32 to the GSM network 33. The terminal 1 comprises a radio circuit 30 with a GSM interface, a vocal telephone assembly 20 and an assembly 10 for adaptation of data. The interface circuit 30 permits connection of the link 32 to the assemblies 10 and 20, in this case one at a time. The adaptation assembly 10 is also connected to the PC 40.

The interface circuit 30 comprises a conventional radio transmitter and receiver tuned to a carrier frequency specific to each one and of which the carrier signal is modulated to transmit, in a radio channel, a voice signal or signals from a modem The link 32 can be connected to this effect or directed, via the radio interface circuit 30, to the assembly 10 or the assembly 20.

The data adaptation assembly 10 comprises a circuit 11 with an interface V24, connected, on the one hand, to the PC 40 and, on the other land, to an assembly 12 for signalling processing and to a data processing assembly 16, which are illustrated confined by a frame of broken lines. A central unit 9 is connected to the assemblies 12 and 16.

The assembly 12 comprises, connected to the interface circuit 11, a function 13 processing conventional telephone signallings (circuit mode) and a function 14 processing signallings for data servers connected to a packet data transmission network. More precisely, this example relates to servers for terminals of the protected mark MINITEL. These servers are connected to a specialised digital network for transmission by packets X25, which network can also be accessed from the switched telephone networks STN and GSM. A GSM signalling function 15 connects the functions 13, 14 to a modem 31 of the assembly 20, connected to the radio circuit 30.

The data processing assembly 16 has a structure similar to that of the assembly 12 with, connected to the interface circuit 11, a function 17 for processing signalling data of the telephone type and a function 18 for processing signalling data of the MINITEL type, these being connected to the modem 31 by means of a directing, or switching, function 19.

In a conventional manner, the telephone assembly 20 comprises a central unit 21 with a microprocessor and a circuit 22 for interface with a telephone set, which are connected to the radio circuit 30. A telephone handset 23, comprising a microphone 24 and receiver 25, is connected to the interface circuit 22.

The PC 40 comprises a circuit 41 with an interface V24 for respectively connecting, by means of the circuit 11, a circuit 43 for processing telematic data to the functions 13, 17 and 18. The PC 40 comprises, in a conventional manner, input/output members for man-machine interaction and in particular in this case a keyboard 42 and a screen 45.

The operation of the terminal 1 and of the PC 40 will now be described.

The establishment of vocal out-going communication by means of the assembly 20 is effected by sending signals, corresponding to the number dialled by the user by means of a keyboard of the terminal 1, to the GSM network 33, under the control of the central unit 21. The conventional means required for this purpose have not been shown. The interface circuit 22 polarises the microphone 24 and ensures a modulation adaptor function in order to effect, in both directions, an adaptation between the analogue voice signals and the modulation provided for the radio transmission, in this case GMSK type modulation.

For a transmission of data between the PC 40 and another data transmission device connected to the GSM network 33, directly or via another network, the assembly 10 ensures the adaptation of the data exchanged between the two devices, in order for them to be able to be transmitted via the GSM network 33.

In a first case, relating to the establishment of a link for data in telephone or "circuit" mode towards a terminal connected to the GSM network 33 directly or via the analogue network STN, a user activates the circuit 43 from the keyboard 42. The circuit 43 comprises a software memory which is addressed in order to transmit, by the circuit 41, the telephone number of the called terminal. The number transmitted by the circuit 41 is received by the function 13 via the circuit 11. This directing towards the function 13 is in fact carried out via the central unit 9 which analyses the signalling received and directs it towards the function 13 or the function 14 depending on the nature thereof telephonic, circuit mode or MINITEL type. This number is transmitted to the function 15 which manages the establishment of the GSM communication and in particular ensures the functions of the level 3 layer in the seven layers of the international OSI classification. Thus, by means of the modem 31, the function 15 exchanges a sequence of signalling messages with the GSM network 33 and adapts this sequence depending on the signalling messages received from the network in response to each message in order to manage the establishment and termination of communication. The function 15 also controls the modem 31 for connection to the circuit 30, in the sense that it can configure it according to specific parameters such as, for example, its speed and modulation frequencies.

Once communication has been established via the network 33 with the called terminal, the transmission of data between them involves the assembly 16. The function 17 ensures in particular the adaptation of data between the interface V 24 and the GSM network 33 with respect to their presentation format. This is a matter of the function RA1' of the ETSI recommendation 04.21, relating to the assembly/disassembly of frames V110 of 36 or 60 bits with 24 or 48 useful bits and 12 service bits from/to blocks of 64 useful bits. The V24 interface transmits at 2.4, 4.8 or 9.6 kb/s, whereas, as far as the GSM network 33 is concerned, the bits are exchanged at a rate of 3.6, 6 or 12 kb/s. The function 18 carries out the RA0 function of the recommendation 04.21, ie. the adaptation of output between synchronous data and asynchronous data, towards the nearest higher output $2^n \times 600$ bits/s (n: positive integer) by adding bits or by suppression of "stop" bits. A direct link between the functions 17 and 18 permits them to cooperate in processing the same block of data. The central unit 9 can in particular control the assembly 16 by commands coming from the assembly 12 and supply information in return.

During transmission of data on the GSM network 33, the function 17 reads the data on the interface 11 V24 and places them in a buffer memory. In a cyclic manner these data are encoded to the format V110 and, for example, 6 bytes become 9 bytes by addition of start and stop bits. For example, at the rate of 2400 bits/s, the same sequence is applied in the form of a software loop every 45 bytes. During reception of blocks of data from the GSM network 33, the function 18 withdraws the state bits to constitute a continuous flow of useful data. A search is made for a start bit and/or a stop bit. If the search is positive an indication is made that an item of data information has been detected. When the block has been consumed, the reception of the following block is awaited in order to carry out the same processing. Intermediate buffers are used for processing low output rates.

In the case of the establishment of a call to a MINITEL server, the principle of establishment of communication is the same as above but involves the circuits and functions 44, 14, 17 and 18.

In this example, the assembly 10 serves for adaptation in the transmission of data via the GSM network 33. In other words, the terminal 1, the network 33 and another similar terminal connecting the other data transmission device are transparent with respect to the application. The transmission itself may not be transparent, ie. may comprise in particular detection and correction of errors.

However, it would have been possible to make provision that the adaptation assembly 10 comprises functions relative to the OSI layers above level 3 and in particular processes at least part of the application relative to the data transmitted. It is possible in particular to integrate, thereinto, facsimile or teletex functions, ie. to produce therein a facsimile coupler managing the protocol for the exchange of signalling and data between facsimile machines or devices having this function. A divided facsimile machine is thus provided on the basis of a scanner and a printer which are connected to the PC 40 and exchange image data with the adaptation assembly 10.

As indicated above, the functions described are in some cases carried out by a single circuit in a time-sharing manner. This is true in particular for the central unit 9 and the central unit 21 which are produced by a common central unit, thus managing the vocal telephone communications and the data passing through the adaptation assembly 10. The circuit 22 and the modem 31 can be a single modulation/demodulation circuit associated with the radio circuit 30 for analogue, voice or digital signals. In particular the recognition/generation of digital modulation signals of the modem 31 can be carried out by the common central unit or by a signal processor. In the same way again, the signalling recognition functions from the PC 40, carried out by the assembly 12, and the functions of the assembly 16 can be processed by the common central unit. Thus a common voice/data central unit can process, in a timesharing manner and under the control of software suitable for this process, the telephonic functions and those described for the assembly 10. To sum up, the assembly 10 only requires central unit time and no additional circuit.

FIG. 2 illustrates a variation wherein the terminal having the reference 100 processes functions relative to the OSI layers above level 3 in order in particular to reach the application layer, ie the data transmission means (40) are integrated into the terminal 100.

The functions of the elements of FIG. 1 which retain their reference numbers here are unchanged. The means for interaction between the user and the machine 42 and 45 can be connected to the terminal 100 by a removable cable or, as shown, are integrated therein. The interface circuit 11 is no longer required.

The above illustration by functional blocks is for the sake of clarity of explanation. In practice, a single central unit will preferably be used comprising a microprocessor (9), working memories for storing the data and memories with various programs for processing the OSI layers 2 to 7. In such a case, it is thus possible to consider that this central unit constitutes data adaptation means, processing the functions of establishment and termination of a link through the particular network in question, in this case GSM radio (layers 2 and 3), adaptation means arranged to process one or more applications (layers 4 to 7), the application functions being in essence independent of the nature of the transmission, radio or wire network.

One example of application relating to the transmission of short radio messages, referred to as SMS, is described hereinunder.

This is a matter of transmission, from the terminal 100, of the text of the message and the address of a subscribing addressee via a videotex messaging server of the GSM network where it is processed. In a conventional manner the addressee is advised of the arrival of the message by the SMS service.

The sequencing of the operations of the protocol of transmission from the terminal 100 managed by the aforementioned program memories is as follows.

The user of the terminal 100 activates the program for the transmission of short messages. The operation of the modem 31 is thus configured in accordance with parameters stores in the program memory, determining amongst other things, the speed, parity and analogue or digital nature of the signals transmitted in the network.

A local server manager having supplied a welcome page, the application is synchronised thereto in order to send a series of characters comprising the name of the server. The application is synchronised to another series of characters "telephone number of correspondent called, dialled (42) by the user, and displays it on the screen (45). However, this latter series of characters can easily be stored in advance.

The series of characters input into the keyboard 42 is then transmitted to the server with possible conversion of certain characters.

The user having typed the short message into the keyboard 42 and having stored it in a working memory, the application is then synchronised to the reception of the series of characters "text to be sent" coming from the server and it displays on the screen 45: "Select short message in memory then validate". All these characters and messages can also be stored in advance.

After filtering and conversion, the series of characters of the message input and provisionally stored locally is then transmitted to the server after validation by the user.

The application is synchronised to the series of characters "message sent" and displays on the screen a message of success which ends the transmission sequence of the short message.

The program memory can contain a plurality of applications and can be modified from the keyboard 42.

What is claimed is:

1. A radio-telephone terminal, comprising:

connection means to connect to a digital radio-telephone network, data adaption means arranged to be connected to a data transmission device, and a central unit for management of vocal telephone communications and communications of the data;

wherein the central unit is arranged in order, in a timesharing manner, to manage said vocal telephone communications and to proceed with said adaption of the digital data by adapting the format and rate of the data.

2. The terminal according to claim 1, wherein the adaption means is arranged to control means for establishing a telephone communication.

3. The terminal according to claim 2, wherein the adaption means is arranged to manage a packet data transmission.

4. The terminal according to claim 3, wherein the central unit is arranged to manage the data.

5. The terminal according to claim 4, wherein the data transmission device is integrated into the terminal.

6. The terminal according to claim 5, wherein the adaption means is arranged to manage a facsimile protocol.

7. The terminal according to claim 6, wherein the adaptation means is arranged to manage a teletex protocol.

8. The terminal according to claim 6, wherein the data transmission device is arranged to transmit short messages.

9. Terminal according to claim 6, wherein the data transmission device is arranged to transmit short messages.

10. The terminal according to claim 5, wherein the adaption means is arranged to manage a teletex protocol.

11. The terminal according to claim 10, wherein the data transmission device is arranged to transmit short messages.

12. The terminal according to claim 5, wherein the data transmission device is arranged to transmit short messages.

13. The terminal according to claim 2, wherein the central unit is arranged to manage the data.

14. The terminal according to claim 2, wherein the data transmission device is integrated into the terminal (100).

15. The terminal according to claim 3, wherein the data transmission device is integrated into the terminal (100).

16. The terminal according to claim 1, wherein the adaptation means is arranged to manage a packet data transmission.

17. The terminal according to claim 1, wherein the central unit is arranged to manage the data.

18. The terminal according to claim 1, wherein the data transmission device is integrated into the terminal.

* * * * *